United States Patent [19]
von Stein et al.

[11] Patent Number: 5,081,486
[45] Date of Patent: Jan. 14, 1992

[54] PROCESS FOR THE PREPARATION OF PHOTOGRAPHIC COLOR COPIES FROM COPY MASTERS

[75] Inventors: Werner R. von Stein, Hamburg, Fed. Rep. of Germany; Walter Kraft, Zurich, Switzerland

[73] Assignee: Gretag Systems, Inc., Bothell, Wash.

[21] Appl. No.: 641,265

[22] Filed: Jan. 15, 1991

[30] Foreign Application Priority Data

Jan. 15, 1990 [CH] Switzerland .......................... 111/90
Jan. 30, 1990 [CH] Switzerland .......................... 284/90

[51] Int. Cl.$^5$ .................... G03B 27/80; G03B 27/32
[52] U.S. Cl. ........................................ 355/38; 355/77
[58] Field of Search ................ 355/32, 35, 38, 77, 355/88

[56] References Cited

U.S. PATENT DOCUMENTS

| | | | |
|---|---|---|---|
| 4,092,067 | 5/1978 | Grossmann | 355/77 |
| 4,101,216 | 7/1978 | Grossmann | 355/38 X |
| 4,279,505 | 7/1981 | Ursprung et al. | 355/77 |
| 4,577,961 | 3/1986 | Terashita | 355/77 |
| 4,681,427 | 7/1987 | Plummer | 355/38 X |
| 4,707,120 | 11/1987 | Yamamoto | 355/38 |
| 4,783,684 | 11/1988 | Rauh | 355/38 |
| 4,806,986 | 2/1989 | Tokuda | 355/38 |
| 4,951,084 | 8/1990 | von Stein et al. | 355/38 |
| 4,975,737 | 12/1990 | Murooka et al. | 355/77 |

FOREIGN PATENT DOCUMENTS

| | | |
|---|---|---|
| 825205 | 12/1951 | Fed. Rep. of Germany . |
| 1300003 | 7/1969 | Fed. Rep. of Germany . |
| 2219849 | 11/1972 | Fed. Rep. of Germany . |
| 398297 | 2/1966 | Switzerland . |
| 483034 | 1/1970 | Switzerland . |

OTHER PUBLICATIONS

Japanese Patent Document No. JP-A-60 182433, Sep. 1985.
European Search Report RS 85763 CH, Aug. 1990.

*Primary Examiner*—Richard A. Wintercorn
*Attorney, Agent, or Firm*—Burns, Doane, Swecker & Mathis

[57] ABSTRACT

Process wherein the slope of linear segments of color density curves of color copy material are affected in a controlled manner by homogeneous supplemental exposures. The quantities of light required for the supplemental exposures are determined by the analysis of the spectral density values of the copy master and by comparison with the color density curves of the copy material.

41 Claims, 6 Drawing Sheets

PROCESS FOR THE PREPARATION OF PHOTOGRAPHIC COLOR COPIES FROM COPY MASTERS

BACKGROUND OF THE INVENTION

The invention concerns a process for the preparation of photographic color copies of copy masters with a photographic color copy apparatus, whereby the copy master is spectrally measured, in particular in the base colors blue, green and red, and the necessary quantities of copying light determined from the measured data and the copy master copied with the copy light quantities determined onto photographic copy material with known color density curves.

Film materials customarily used in photography, in particular color photography, especially negative films, are characterized by low slopes of the linear segments of the color density curves and a corresponding high exposure latitude. Therefore, with correct exposure, both the shadows and the lights of a high contrast scene may be reproduced with a slight loss of detail contrast on the film material. On the other hand, the usual copy materials available, in particular color papers, display significantly higher slopes of the linear segments of the color density curves and correspondingly have much smaller latitudes than the negative materials. The shadow parts of the copy master are already located mainly in the shoulder of the color density curve while the lights are located in the foot of the color density curve, so that there is a drastic loss of detail contrast. In the case of high contrast negative exposures often copies with false colors and unsatisfactory detail contrasts are obtained.

Particularly high contrast scenes are encountered primarily in snow images, flash exposures and counterlight exposures. In flash exposures, especially flash portraits, facial features are often too "hard." In addition, generally the color tone of the skin color is considered too "cold," which is the result of the spectral compositions of the flash, which is different from the spectral composition (or color temperature) of daylight. Details in shadowy parts are mostly lost. Counterlight exposures, on the other hand usually have more or less extensive sky portions, which in the negative appear to be strongly overexposed compared to other areas important for the overall image. Copies of such masters show no detail in their sky portions. Any attempt to correctly reproduce at least the important part relative to the image of the master in regard to color and density gradation, is usually at the expense of an acceptable reproduction of the brightest portions and the shadows. Further, it is very difficult in manual processing to decide what the parts important relative to the image are and in the case of automatic color copying equipment, is it practically impossible.

In the field of black-white photography, users have available photographic papers with different exposure latitudes. Depending on the contrast range of a copy master or the detail contrast desired, photographic papers with differently sloped linear segments of the blackening curve (gradation) are used. Papers with different gradation may be selected in small series and in amateur operations, while for automatic color copy apparatuses with constantly varying copy masters having different contrast ranges, such a constant change of papers is hardly practical.

DE-C-825 205 describes the problem of preparing soft, harmonic black-white images from the hard or at least high contrast photographic negatives. It is proposed therein to affect the slope of the blackening curve, the gradation of the black-white paper by a metered diffuse exposure of the paper. This exposure is carried out in addition to the principal exposure through the negative. Beginning with a paper of a harder gradation, it is then possible to reduce the gradation, thereby achieving softer black-white copies.

DE-B-1 300 003 discloses that it is possible in the case of monochromatic and color extraction processes and in particular in copying through halftone image fields, to affect the gradation of a photographic material (plate, paper) by a diffuse exposure in addition to the main exposure of the image. This additional exposure may be of the same duration as the principal exposure. The latter is determined by the brightest parts of the image reproduced and the supplemental exposure is determined by the shadow parts.

In DE-C-2 219 849 it is proposed to carry out the photographic reproduction of halftone masters in black-white and in color, and, in particular, the preparation of color extracts (selection negatives), using a normal exposure and a supplemental exposure of the same intensity. No further details of this process are provided by the document cited.

The aforecited documents indicate that it is, in principle, possible in black-white photography in the photographic reproduction of halftone masters and in the preparation of selection negatives (color extracts), to affect the gradation properties of photographic materials (plates, papers) by a supplemental exposure in addition to the normal exposure. However, no indication is given of a process for the preparation of color copies with acceptable coloring and true to detail color copies of high contrast masters.

SUMMARY OF INVENTION

It is therefore an object of the present invention to improve the exposure control of a photographic color copying apparatus so that copies which are acceptable relative to their contrast and which are true in detail copies of high contrast masters may be prepared. In particular, a process is described which yields at least acceptable copies even in the case of problematic exposures, such as for example flash scenes or counterlit scenes. The process further makes it possible to affect copies relative to color, density and gradation, as desired. The process is also simple in its application and makes relatively simple links with existing exposure control processes possible, for example those described in EP-A-312 499. Another object of the invention consists of improving an exposure control so that correct color copies may be prepared from copy masters where, in view of their large contrast range, there is a danger that in the color copies prepared the lights and shadows may be reproduced with different color casts. This problem, also called tilting behavior, appears relatively frequently in the customarily used color films and papers. Tilting behavior is caused by the linear segments of the individual color density curves not always being parallel and by the color film or paper having different gradations in the individual sensitized spectral regions.

BRIEF DESCRIPTION OF THE DRAWINGS

Other objects and advantages of the present invention will become more apparent from the following detailed description of preferred embodiments described in conjunction with the accompanying drawings, wherein like elements have been assigned like numerals and wherein.

DETAILED DESCRIPTION OF THE PREFERRED EMBODIMENTS

Figure 1:
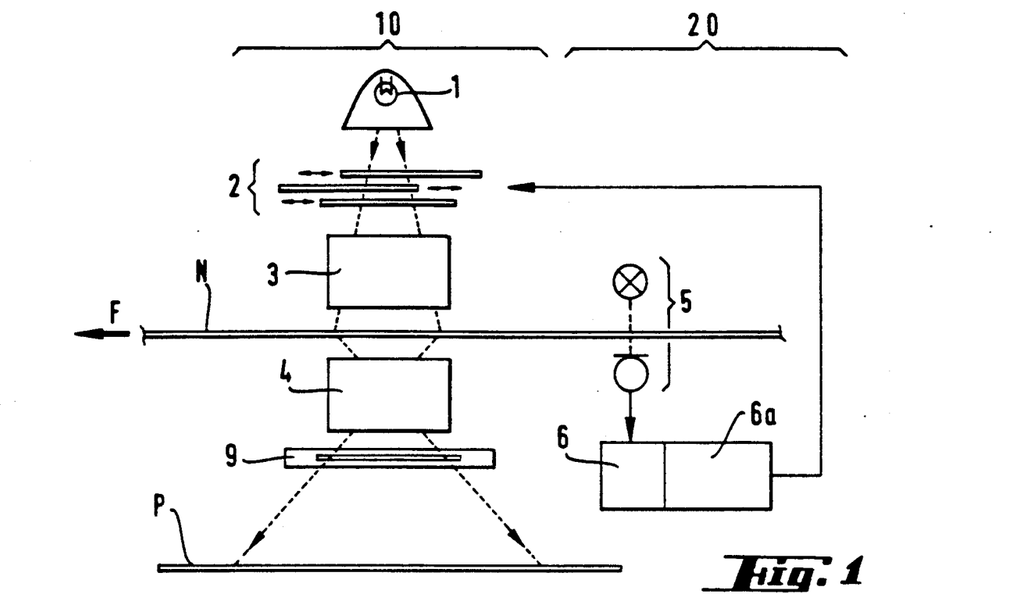
FIG. 1 shows an exemplary photographic color copying apparatus to carry out a process in accordance with the present invention.

The photographic color copy apparatus shown in FIG. 1 essentially comprises two stations, i.e., a measuring station and an exposure station, through which a preferably strip shaped copy master N, usually a negative film, is passed in succession. The direction of transport is indicated by the arrow F. In the measuring station 20 the scanning, measurement and analysis of the copy master N is carried out and in the exposure station 10 the copy master N is imaged on a photosensitive color copy material P, usually a so-called color paper. With the exception of differences in the configuration of the exposure station 10 to be explained later, the photographic copy apparatus is identical with that of conventional devices of this type, for example those known from U.S. Pat. No. 4,092,067, U.S. Pat. No. 4,101,216 and U.S. Pat. No. 4,279,505 or the published European application EP-A-312 499 the disclosures of which are hereby incorporated by reference in their entirety. In FIG. 1 therefore only the essential components necessary for an understanding of the invention of such a color copy apparatus are shown. It comprises in the measuring station 20 a measuring layout 5 containing a source of measuring light and photoelectric detectors, and in the exposure station 10 a source 1 of copying light, a set of servocontrolled color filters 2 or the like, an imaging layout 3, 4 and a shutter 9. A computer and control unit 6, 6a for the evaluation of measured data and for exposure control is coordinated with both the measuring station and the exposure station 10.

Photographic copy devices of this fundamental configuration are, for example, the high capacity printers Model 3139, 3140 and 3141 of the Gretag Co., Regensdorf, Switzerland, which are in worldwide use. In the aforementioned copy device, the copy master N is measured by sections, for example with a resolution of about 100 scanning sections S (points) per master and more. Each scanning section S is resolved into several spectral regions, in particular in the three base colors blue B, green G and red R. From the measured spectral values, so-called color extract values are determined for the spectral regions, wherein the spectral sensitivities of the measuring layout approximately correspond to the sensitivities of the copy material P. These about 300 and more color extract values are then evaluated in known fashion in keeping with different criteria to determine the necessary quantities L of the copying light and the exposure of the photosensitive color copy material P which is controlled correspondingly. Examples of this evaluation and the determination of the quantities of copying light are set forth, for example, in U.S. Pat. Nos. 4,279,505 and EP-A-31 499.

Figure 4:
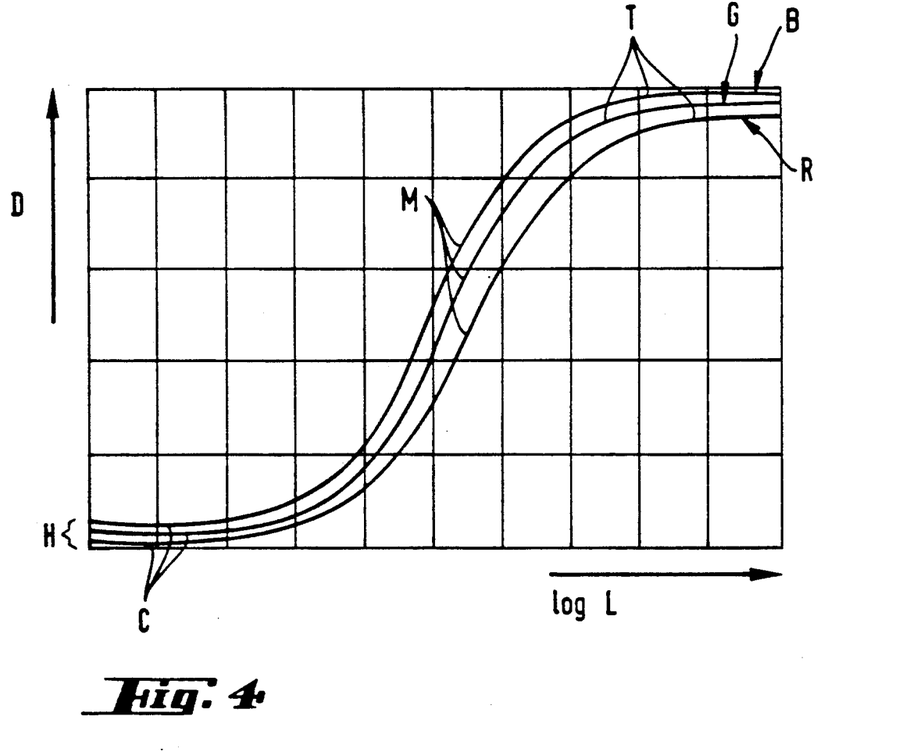
FIG. 4 shows color density curves of a color copy material.

FIG. 4 shows the color density curve configurations of a color copy material P. Ideally, it contains parallel color density curves D for the spectral region concerned, here blue B, green G, red R, of the sensitized colorant layers. On the horizontal axis, the abscissa, the logarithm of the exposure, the product of light intensity and exposure time, is plotted. On the vertical axis, the ordinate, the resultant densitometric color density is plotted. The individual segments of each of the color density curves D are designated in the direction of increasing exposure as the curved foot portion C, the straight line segment M and the shoulder T. The intersections of the curves D with the ordinate yield the prevailing haze value of the photo copy material P. The linear segment M and in particular its slope, which is also referred to as gradation, define the available spectral exposure latitude and the extent of the variation of color density as a function of a change in exposure.

In the case of good color copy materials P, the color density curves differ only slightly qualitatively. For this reason only one such color density curve will be discussed in the following.

Figure 5:
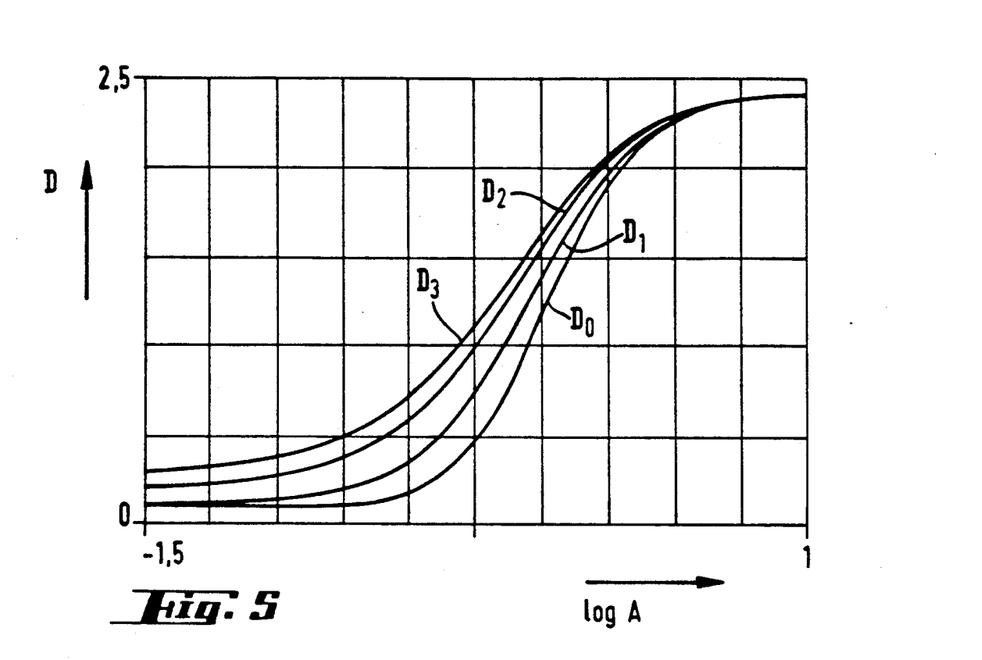
FIG. 5 shows the effect of an additional exposure on the configuration of the color density curves.

FIG. 5 shows the effect of a diffuse supplemental exposure A on the color density curve D. The significance of the axes of the diagram is that of FIG. 4. The different color density curves $D_0$ to $D_3$ are the result of the different intensities of the diffuse supplemental exposures. The curve $D_0$, the lowest in the diagram, corresponds to the normal color density curve with a supplemental exposure. For a color density of 1, the slope $\gamma$ of the linear segment of the lowest curve $D_0$ amounts, for example, to 3.1, while the slope of the uppermost curve $D_3$ is only 1.7 with the same color density. By varying the degree of the supplemental exposure, which is defined as the ratio of the diffuse supplemental exposure A and the imaging exposure E, the gradation may be appreciably affected and reduced.

Figure 6:
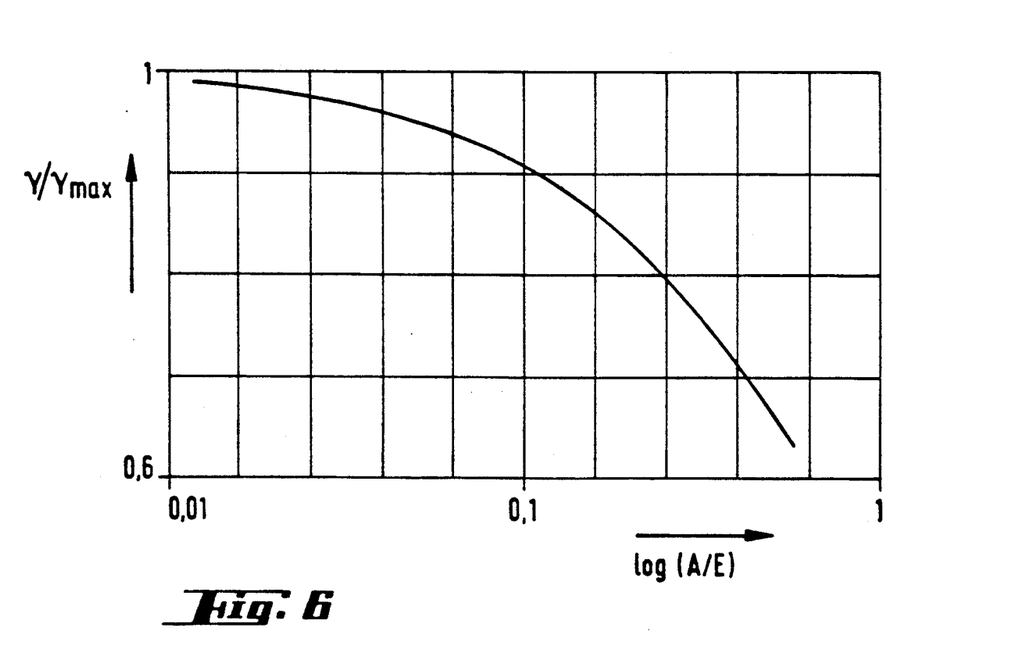
FIG. 6 shows the dependence of the steepness of the linear segment of the color density curve of FIG. 3 on the degree of the additional exposure.

FIG. 6 graphically represents the dependence of the slope of the linear segment of the color density curve in FIG. 5, the gradation, on the degree of supplemental exposure. On the horizontal axis the degree A/E is plotted. On the vertical axis, the ratio of the steepness $\gamma$ to the maximum steepness $\gamma_{max}$ of the color density curve D is plotted. As the parameter, a constant color density of 1 was selected, i.e., a constant total exposure. While the diffuse supplemental exposure A has hardly any effect in the segment of the shoulder T of the color density curve D, in the area of the foot C of the curve beginning at a certain degree of supplemental exposure there is an appreciable increase in the haze value H, as seen in the two uppermost color density curves $D_2$, $D_3$ in FIG. 5. While this increase of the haze value H is in itself undesirable in the reproduction particularly of white objects (for example table cloths, shirts), it may also be used for a controlled variation of the color copy.

The preparation of a color copy true to detail and acceptable relative to color and contrast of a high contrast copy master N is therefore achieved as follows. In an exemplary embodiment, the copy master is examined with regard to the contrast range in the individual spectral regions in addition to the usual analysis to determine the quantities of copying light. For each spectral range B, G, R, quantities of light are then determined as a function of the contrast range determined for the supplemental diffuse exposure A. The computation of the light quantities required is based, for example, on the known color density curves D of the color copy material P (FIG. 4) and the dependence of the steepness $\gamma$ of the linear segments M of the color density curves D on the degree of the supplemental exposure A (FIG. 6). To affect the color density curves D, the color copy material P is then exposed to the diffuse supplemental light A. By proper selecting the degree of supplemental exposure, the spectral haze value H of the color density curve D concerned may be altered and thereby the color sensation of the copy affected in a controlled manner.

Preferably, the quantities of light determined for the diffuse supplemental exposures A are deducted from the quantities of copy light L required, so that the actual exposures E in the individual spectral regions are carried out with the reduced quantities of light, i.e., $E = L - A$. In this manner the total exposure, i.e., the sum of the two exposures remains constant independently of the prevailing degree of the supplemental exposures in the spectral regions. This makes it possible to minimize the effect of the diffuse supplemental exposures A on the color and density impression of the color copy.

The supplemental exposures A may be applied before, during or after the imaging exposures E. Correspondingly, the photographic color copy apparatus may have a pre- or post-exposure station. Preferably, however, the diffuse supplemental exposures A take place in the exposure station 10, in which the imaging exposures E are also carried out. In order to avoid any color falsification of the color copy by the supplemental exposures A, according to a further preferred aspect of the invention, the average spectral composition of the supplemental exposures A is adapted to the average spectral composition of the corresponding imaging exposures E. For this reason, the diffuse supplemental exposures are applied through variable color filters or the like. Usually, the imaging exposure E is not applied uniformly over the copy master N. Rather, it customarily takes place with an (intentional) decrease in intensity toward the edge. Preferably, the light intensity distribution over the area of the diffuse supplemental exposures A is therefore adapted to that of the imaging exposure E in the edge areas. With the exception of this intentional edge decrease, the illumination of the diffuse supplemental exposure A is, however, essentially homogeneous.

The use of a single common source 1 of copy light in the exposure station 10 and the application of the diffuse supplemental exposures A through the color filters 2 or the like for the spectral imaging exposure E are particularly advantageous for establishing uniform spectral and intensity conditions for the imaging exposures E and the diffuse supplemental exposures A.

To carry out the diffuse supplemental exposures A in the exposure station 10, the copy master N may be removed from the beam path of the copy light source 1. To homogenize the diffuse supplemental exposure, a locally homogeneous, preferably light scattering element, for example a diffusing screen, is pivoted into the beam path instead.

This rather manual process for effecting the diffuse supplemental exposures A is especially suitable for photo amateurs or special exposures with a low number of copies (color printer). However, the process of replacing the copy master N, for example, with a diffusing screen may also be automated. For this purpose, for example, the film stage may be rendered mechanically displaceable, so that when the film stage is moved out from the beam path of the copy light source 1, the diffusing screen is automatically pivoted into the beam path.

Figure 2:
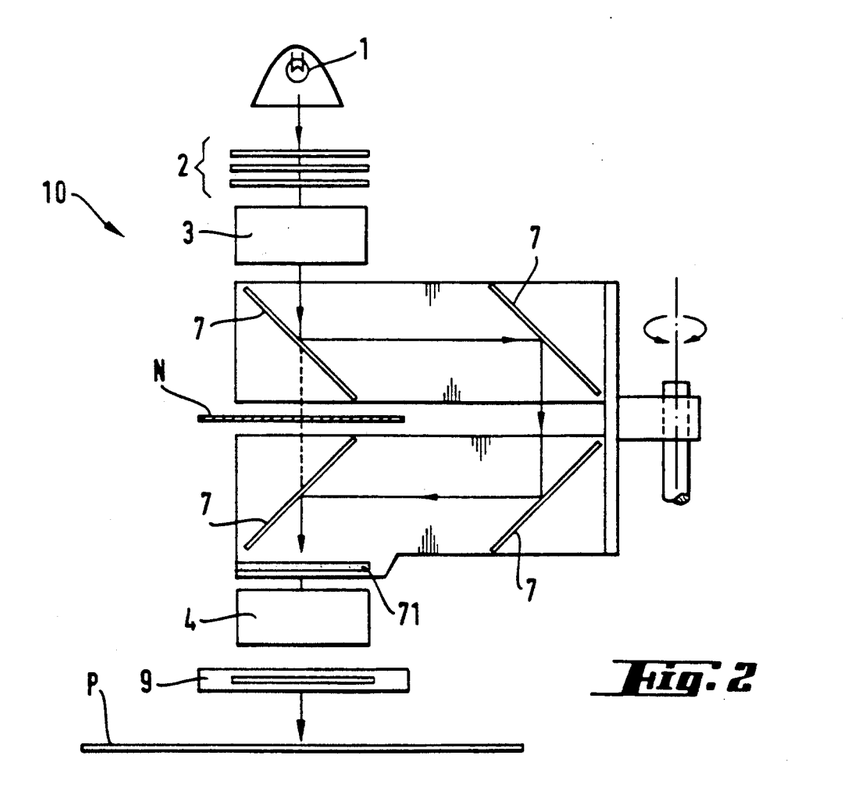
FIGS. 2 and 3 show exemplary embodiments of an exposure station.

A particularly convenient and simple configuration of the exposure station to carry out the process according to an exemplary preferred embodiment of the invention is shown in FIG. 2. In this example, in addition to the copy light source 1, the servocontrolled color filters 2, the imaging layout 3, 4 and the shutter 9, the exposure station includes a plurality of deviation mirrors 7 pivotable into the beam path of the copy light source 1. The deviation mirrors 7 may be pivoted in above or under the copy master N in a manner such that the light of the source 1 passing through the filters 2 is passed by the master N onto the photograph color copy material P. In place of the deviation mirrors 7, deviating prisms or the like may also be provided. To increase the areal homogeneity of the incident light a diffusing element may be additionally pivoted in above the copy material P, and is preferably coupled with the deviating means.

Figure 3:
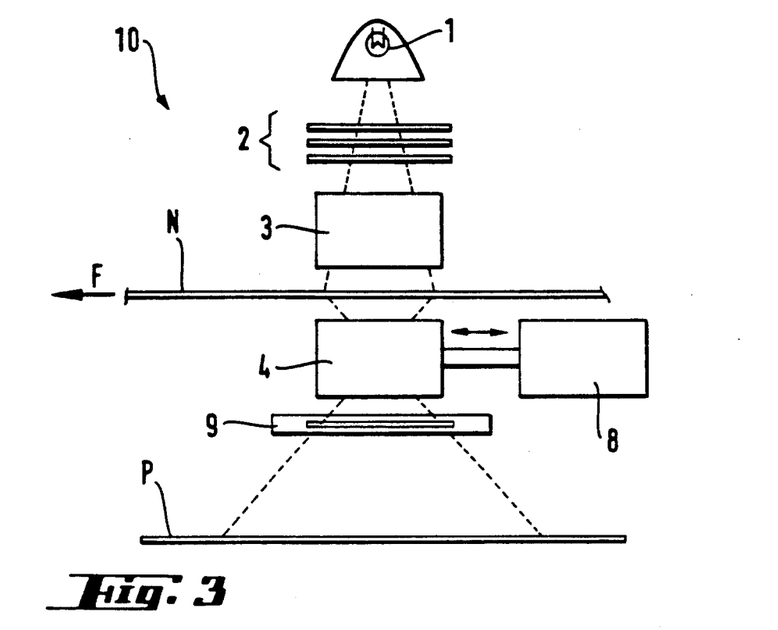

In a further exemplary schematic shown in FIG. 3 of an exposure station 10 to carry out a preferred process of the invention, the part of the imaging layout 4 located under the copy master N is displaceable and coupled with a light mixing device 8. The light mixing device 8, which preferably contains a mirror shaft and/or diffusing screens and/or optical fibers, is inserted into the beam path in place of the lower part of the imaging layout 4. The light for the supplemental exposures A passes both through the filters 2 and the copy master N and is therefore spectrally affected in the same manner as the light for the imaging exposure E. By means of the light mixing device, the light for the diffuse supplemental exposures A is further homogenized spectrally and relative to intensity prior to impacting the color copy material P.

In the variants described above, the supplemental exposures A are carried out on the side of the copy material P coated with a photosensitive emulsion. However, if a copy material P with, for example, a transparent support layer is used, the exposures may take place through the reverse side.

Figure 7:
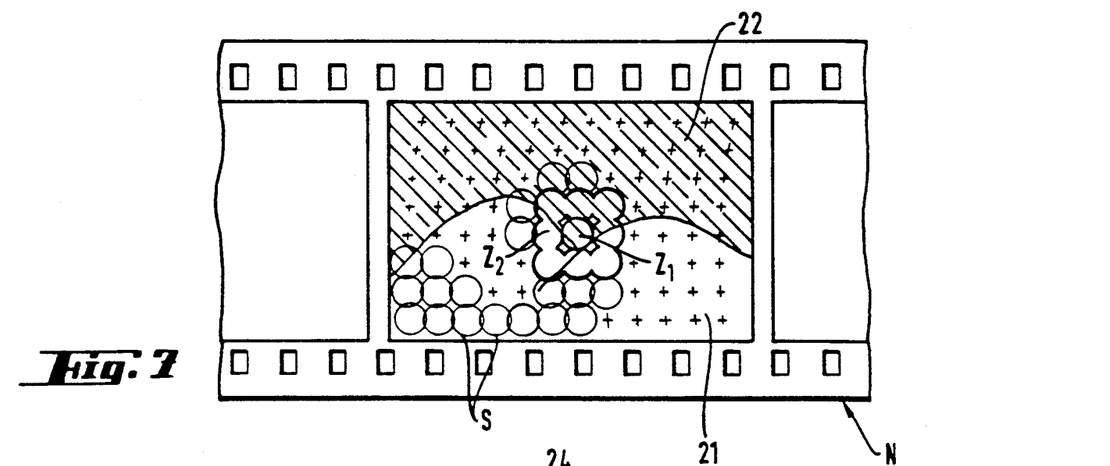
FIG. 7 shows a schematic example of a high contrast copy master with an indication of scanning regions and concentric zones.

FIG. 7 shows an exemplary schematic for a high contrast copy master N. The master shown has very bright areas 21, but also very dark areas 22, indicated by shading. Correspondingly, these areas are identified in the analysis of the master N as areas of very low or of very high color density respectively. The scanning sections S are also indicated in FIG. 7. The copy master N is on the one hand spectrally analyzed to determine the quantities of copy light for the imaging exposure, as described for example in U.S. Pat. No. 4,279,505 and EP 312,499. To determine the contrast range, on the other hand, the copy master N is also examined relative to the lowest and highest color density values. For this purpose, the individual scanning sections S are combined into contiguous zones Z. These zones preferably are approximately concentric. In each of the zones, for every spectral region, a contrast value is determined as the difference between the highest and the lowest color density value. These spectral zone contrast values are averaged, preferably in a centrally weighted manner. The average value obtained in this manner is the contrast range of the copy master in each spectral region, for example blue B, green G or red R. The contrast range of each spectral region is then compared with the usable exposure range of the corresponding sensitized colorant layer of the copy material P. The usable spectral exposure range is determined simply from the known color density curves D and is obtained as the difference of the highest and lowest color densities of the linear curve segment M. Depending on the extent to which the contrast range of each special region exceeds the spectral exposure range, from the known relationship between the degree of supplemental exposure and the slope of the linear segment M of each color density curve D (FIG. 6), the necessary light quantity for the supplemental exposure A is determined. Care must be taken in the process that in case of a maximum supplemental exposure A, the total slope $\gamma$ of the linear color density curve segments M of the copy master N and the color copy material P will not be less then 1. The degree of supplemental exposure A may be determined for every master N separately. However, in most cases it is sufficient to select for every spectral region a constant degree of supplemental exposure A, if the usable exposure range of the copy material P is exceeded, this constant value having been determined by the analysis of a number of high contrast copy masters N. It is frequently even sufficient to select the same degree of supplemental exposure for every spectral region.

Figure 8:
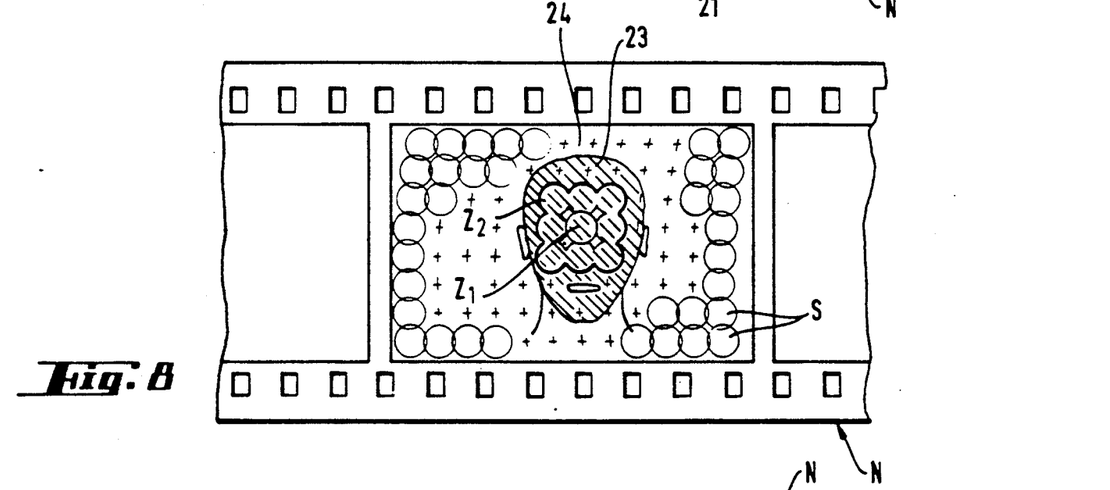
FIG. 8 shows a schematic example of a flash exposure.

In FIG. 8, a flash exposure is symbolically outlined. Copy masters N of flash exposures usually have high color densities in the central region 23, i.e., they are dark, while the peripheral regions 24 have relatively lower color densities and therefore appear very bright. The dark areas are shaded in FIG. 8. In the measuring station 20 the copying master N is scanned by sections. The scanning sections S are indicated in FIG. 8. The quantities of the copy light required are determined in a known manner, such as described for example in U.S. Pat. No. 4,279,505 or EP 312,499. To determine the contrast range of the copy master N for every spectral region, the scanning sections S are conbined into contiguous zones Z. Preferably, concentric zones Z are formed. Within each zone Z the density values of each spectral region B, G, R are determined. The average spectral zone density values of the central 2-4 zones Z are determined, together with the average spectral zone density values of 2-4 peripheral zones Z. The specific spectral contrast range is obtained as the difference of the average spectral zone density values averaged over the central and peripheral zones. The contrast range of each spectral region is then compared with the usable exposure range of the corresponding sensitized colorant layer of the copy material P. The usable spectral exposure range is determined simply from the known color density curves D and is obtained as the difference of the highest and the lowest color densities of the linear curve segments M. Depending on the extent to which the contrast range of each spectral region exceeds the spectral exposure range, from the known relationship between the degree of supplemental exposure and the slope of the linear segment M of the color density curve D concerned (FIG. 6), the necessary quantity of light for the supplemental exposures A is determined. The degree of the supplemental exposure in long wave spectral regions, for example in a red R region is reduced relative to the other spectral regions, for example blue B and green G, by about 30–70%, and preferably by about 50%. In this manner, for example, in the case of flash exposures, a warmer color reproduction of skin tones is obtained, which relative to the rest of the image are overexposed. Care must be taken in determining the degree of supplemental exposure that in case of a maximum supplemental exposure A the total slope $\gamma$ of the linear color density curve segments M of the copy master N and the color copy material P is not less then 1. The degree of supplemental exposure A may be determined for every master N separately. However, in most cases it is sufficient to select for every spectral region a constant degree of supplemental exposure A, if the usable exposure range of the copy material P is exceeded, this constant value having been determined by the analysis of a number of high contrast copy masters N. It is frequently even sufficient to select the same degree of supplemental exposure for the short wave regions, here for example for blue B and green G.

Figure 9:
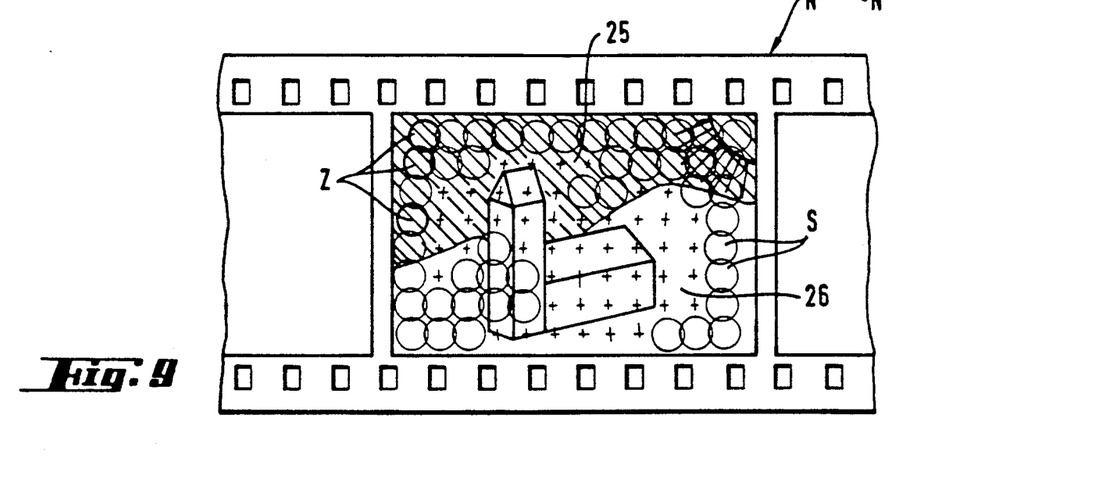
FIG. 9 shows a schematic example of a counterlit exposure.

In FIG. 9 an example of a counter light exposure is shown. Counter line images usually contain more or less extensive sky portions 25, which on the copy master N appear strongly overexposed compared with the important portions 26 of the image. These portions 25 therefore have a very high density relative to the latter portions, which have lower densities. The darker portions 25 are indicated in FIG. 9 by shading. In the measuring station 20 the copy master N is scanned by sections. The individual sections S are indicated in FIG. 9. The necessary copy light quantities are determined in a known manner, for example as described in U.S. Pat. No. 4,279,505 or EP 312,499. To determine the contrast range of the copy master N for each of the spectral regions examined, the corresponding color densities of the individual scanning sections S are compared with each other. In the short wave spectral region, here for example for the color blue B, all of the scanning sections S having density values for B which exceed a certain threshold value are combined into contiguous zones Z, extending from the peripheral sections S toward the center of the copy master N. The threshold value is preferably set at about $\frac{2}{3}$ of the density interval between the minimum and the maximum density value. It may, however, be shifted toward higher or lower density values as needed. The color density values are then reduced (by computation) in these contiguous zones Z determined in this manner. These values are reduced preferably to 0.6–0.8 times of their original value, such that the reduced color density value is not smaller than the minimum color density value measured. In this manner the "sky portions" will have a reduced effect only on the exposure. The spectral contrast range in the individual spectral regions, here the colors blue B, green G and red R, is determined as the difference between the corresponding highest and lowest color density values. The contrast range of each spectral region is then compared with the usable exposure range of the corresponding sensitized color layer of the copy material P. The usable spectral exposure range is determined simply from the known color density curves D and is obtained as the difference between the highest and lowest color densities of the linear curve segments M. Depending on the extent to which the contrast range of each spectral region exceeds the spectral exposure range, the quantity of light required for the supplemental exposures A is determined from the known relationship between the degree of supplemental exposure and the slope of the linear segment M of the color density curve D (FIG. 6) concerned.

The degree of supplemental exposure A may be determined for every master N separately. However, in most cases it is sufficient to select a constant degree of supplemental exposure A for every spectral region, if the usable exposure range of the copy material P is exceeded, this constant value having been determined by the analysis of a number of high contrast copy masters N. In the case of copy masters N, the contiguous zones Z for the short wave spectral region of which, here for the color blue B, comprise more than about 15-30% and preferably 20%, of all of the scanning sections, the degree of supplemental exposures is increased by about 30-70% and preferably about 50%. Thus, a stronger coloric saturation of the "sky portions" is obtained. It is frequently even sufficient to select the same degree of supplemental exposure for the short wave regions, here for example blue B and green G.

Figure 10:
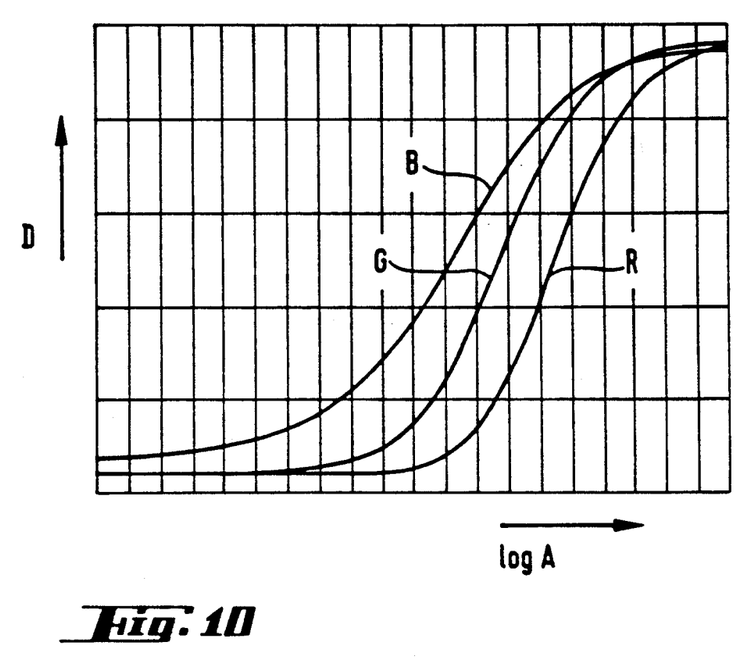
FIG. 10 shows color density curve configurations of a typical color copy material without additional exposures.
Figure 11:
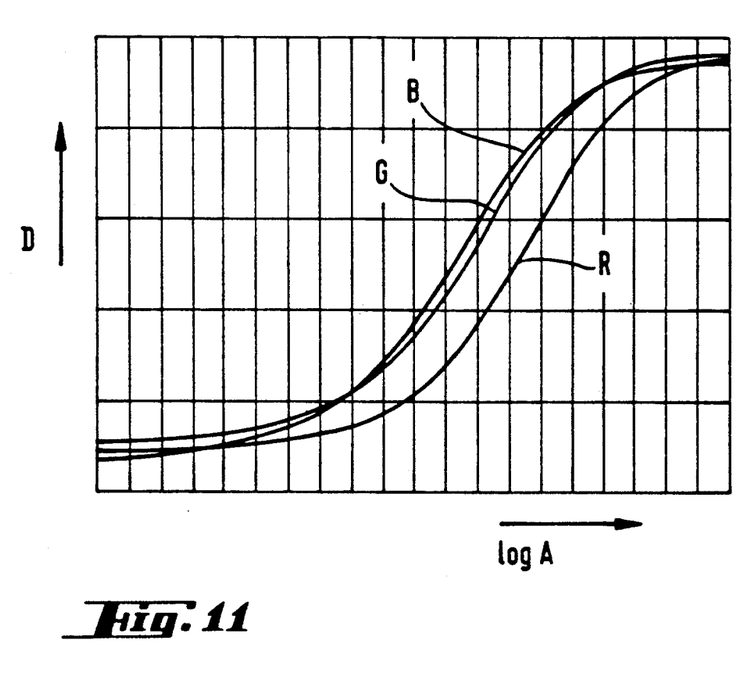
FIG. 11 shows color density curve configurations of the color copy materials of FIG. 10 with additional exposures.

FIGS. 10 and 11 show color density curves D of a color copy material P which cause tilting phenomena. In FIG. 10, the color density curves D for the colors blue B, green G and red R of a sensitized copy material P are shown without supplemental exposure A. The curves in FIG. 11 are obtained for the same copy material with a certain degree of supplemental exposure. It is seen from the color density curves without supplemental exposure that the linear segments M have different slopes and the color copy material therefore has a different gradation for each color.

In order to avoid a copy on a color copy material P receiving complementary color casts depending on the exposure in the highlights and in the shadows, the steeper color density curves are adapted to the slope of the flattest curve. For this, the copy material P is additionally exposed to the diffuse light of the spectral region belonging to the steeper curve. The determination of the quantities of light required for such diffuse supplemental exposures A is preferably carried out by test copies of step wedges, wherein the degree of the supplemental exposures is varied until the copy of the step wedge appears to be balanced in color. But the necessary quantities of light may also be determined by the previously determined relationships between the slope of the linear segment M of the color density curve D of the color material P and the degree of the diffuse supplemental exposure (FIG. 6).

Figure 12:
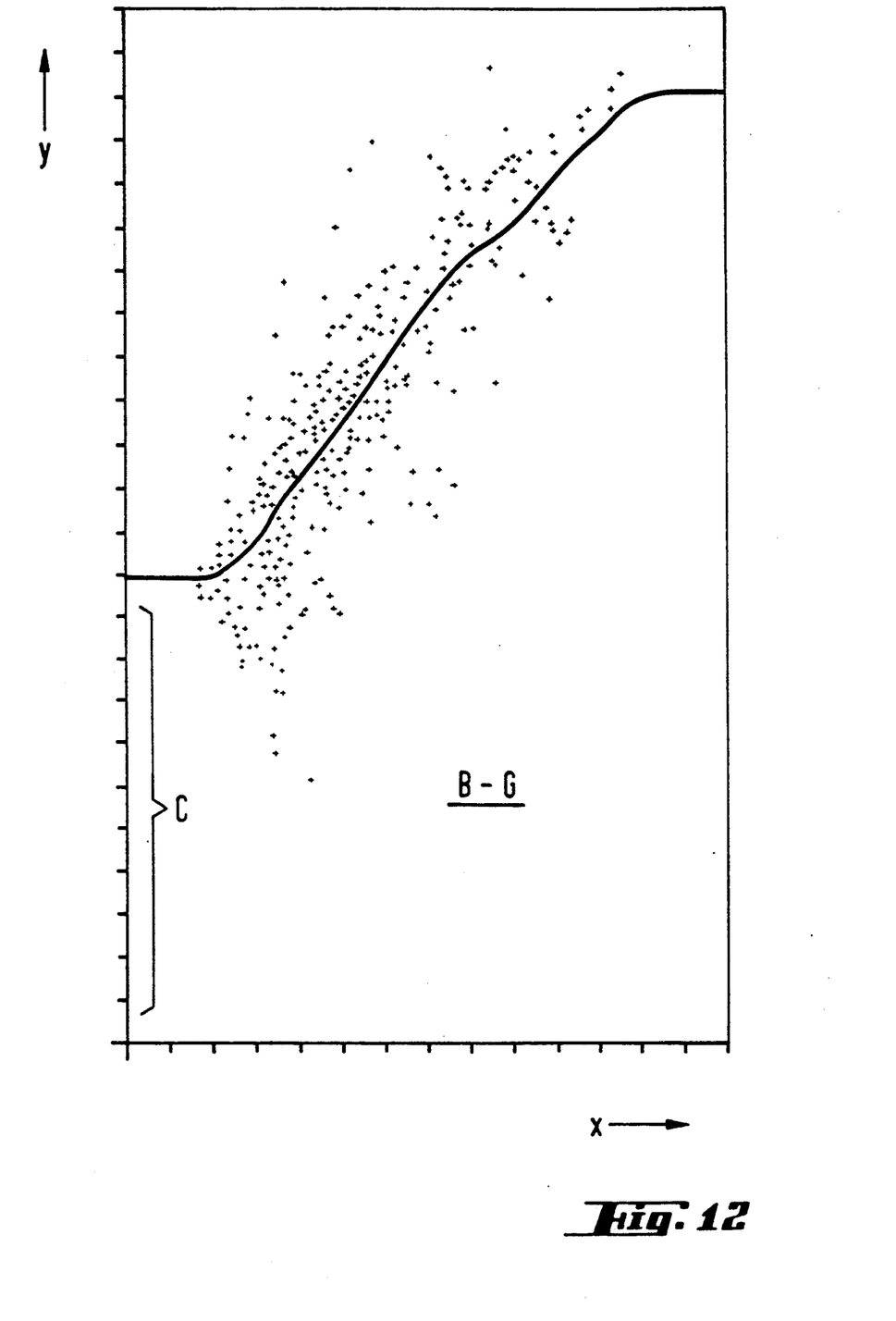
FIG. 12 shows a color density curve of a copy master approximated from analysis data.

FIG. 12 shows an example of the color density variation of a copy master N, which may be determined approximately from an analysis of the measured data. In order to be able to obtain acceptable copies even from copy masters N which have different color casts in the areas of high and low color densities, the copy master N is examined for so-called color tilting. Depending on the extent to which certain spectral regions predominate in more or less dense areas, the quantities of light are determined for the diffuse supplemental exposures A in the respective spectral regions and the copy material P is diffusely exposed to the light quantities determined. To determine tilting behavior, the individual color density values of each scanning sections S are compared with a neutral density of the scanning sections S. This neutral density is obtained as the average value of all of the color densities of the scanning sections S concerned. For each spectral section the total number of these value pairs (color density values of the scanning sections and the corresponding neutral values) of the copy master N are subjected to a nonlinear regressive analysis. Preferably a cubic fit of the type $y = ax^3 + a_2x^2 a_3x + c$ is selected, wherein y is the spectral density, x the neutral density, c is a type of base haze, and $a_1$, $a_2$ and $a_3$ are the coefficients to be determined. This analysis may be carried out separately for each spectral region, but preferably individual spectral regions are subtracted from each other, so that for example the blue-green curve shown in FIG. 11 is obtained. Similarly, for example a red-green curve may be formed. In this manner, in the blue, green and red color system the formation of two curves is sufficient for an evaluation. The slope of the color density variations determined in this manner yields information concerning the extent of any tilting of the copy master N. The inclination of the curve in FIG. 11 is the result of the fact that the color density curve of the blue sensitive layer is steeper than that of the green sensitive layer. This inequality is taken into account by a corresponding reduction of the slope of the color density curve of the green sensitive layer of the copy material P. For this, the copy material is additionally exposed to the light of the spectral regions in which the spectral density curve of the copy master N in the linear segment has a steeper slope than the linear segment M of the color density curve with the lowest steepness. The quantities of light for the diffuse supplemental exposures are determined preferably from the relationships between the slope of the linear segment M of the color density curve D of the copy material P concerned and the degree of the supplemental exposure (FIG. 6).

In the foregoing a preferred process of the invention was explained by the exemplary copying of a negative master. However, it will be apparent to those skilled in the art that the process according to the invention may be applied advantageously to the copy of slides on reversing copy material.

By means of the supplemental exposures according to the invention the color copy material may be adapted in a simple manner to the contrast and color conditions of the copy material. Color copy materials with excessively steep linear segments of the color density curves, i.e., with excessive gradations, may be affected in a controlled manner and the gradation reduced. The process according to the invention makes it possible to prepare color copies true to detail and acceptable relative to color and contrast. By the controlled raising of the spectral haze value, the color copy may also be affected artistically as desired. The process is simple in its application and may be integrated relatively easily into numerous existing exposure control processes.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Process for the preparation of photographic color copies of copy masters with a photographic color copy apparatus, comprising the steps of:
   spectrally measuring the copy master to provide data from spectral regions;
   determining quantities of copying light necessary for imaging exposures of the copy master from the measured data;
   copying the copy master with the copy light quantities onto photographic copy material having known color density curves;
   determining the contrast range of the copy master for each spectral region;
   computing quantities of light for homogeneous supplemental exposures using the contrast range determined; and
   additionally exposing the color copy material to the homogeneous supplemental lights to affect the color density curves.

2. Process according to claim 1, wherein the copy master is spectrally measured in spectral regions associated with the base colors blue, green and red.

3. Process according to claim 1, wherein the necessary copy light quantities for the imaging exposures in the spectral regions are reduced by the quantities of light computed for the supplemental exposures.

4. Process according to claim 3, wherein the copy master is scanned by sections and the scanning sections are preferably combined into concentric zones.

5. Process according to claim 4, wherein within each zone for each spectral region, a zone contrast value is determined by obtaining a difference between the highest and lowest corresponding color density values in the zone, such that by weighted averaging of zone contrast values for each spectral region, the corresponding contrast range of the copy master is determined.

6. Process according to claim 5, wherein for each spectral region, the contrast range of the copy master is compared with a usable exposure range determined from the known color density curves of the copy material, and a degree of supplemental exposure is determined based on the extent to which the contrast range exceeds the exposure range such that for a maximum supplemental exposure, the exposed copy material for each spectral region has a total slope not less than a value 1, with said slope being a combined slope of the color density curves of the copy master and the copy material.

7. Process according to claim 6, wherein for each spectral region, a constant degree of supplemental exposure is selected which previously has been determined from a number of high contrast copy masters.

8. Process according to claim 7, wherein for each spectral region the same degree of supplemental exposure is selected.

9. Process according to claim 4, wherein for each zone, average color density values for each spectral region are determined and the contrast range of the copy master for the spectral region is determined as a difference between corresponding color density values averaged over 2-4 central zones and color density values averaged over 2-4 peripheral zones.

10. Process according to claim 9, wherein for each spectral region, the contrast range of the copy master is compared with a usable exposure range determined from the corresponding known color curves of the copy material, and a degree of supplemental exposure is determined based on the extent to which the contrast range exceeds the exposure range, such that for a maximum supplemental exposure the copy material exposed for each spectral region has a total slope not less than 1, wherein the total slope is a combined slope of color density curves of the copy master and the copy material and wherein the degree of supplemental exposure in the long wave spectral region is reduced relative to the other regions by about 30-70%, and preferably by about 50%.

11. Process according to claim 10, wherein for each spectral region a constant degree of supplemental exposure is selected, which previously has been determined for a number of high contrast copy masters.

12. Process according to claim 10, wherein for the short wave spectral regions of the copy master the same degree of supplemental exposure is selected.

13. Process according to claim 4, wherein color density values for all of the scanning sections of the copy master which exceed a certain threshold value in a short wave spectral region and which extend from peripheral scanning regions toward a center of the copy master, are combined into contiguous zones, color density values of said contiguous zones are reduced, and a contrast range of the copy master is determined in the individual spectral regions as the difference between the highest and the lowest corresponding color density value.

14. Process according to claim 13, wherein for each spectral region, the contrast range of the copy master is compared with a usable exposure range determined from the corresponding known color density curves of the copy material, and a degree of supplemental exposure is determined based on the extent to which the contrast range exceeds the exposure range such that for a maximum supplemental exposure, the exposed copy material has for each spectral region a total slope, which is not less than 1, said total slope being combined from a slope of the color density curves of the copy master and the copy material.

15. Process according to claim 14, wherein for each spectral region, a constant degree of supplemental exposure is selected which has been determined previously for a plurality of high contrast copy masters.

16. Process according to claim 14, wherein the contiguous zones of the copy master comprise, for the short wave spectral region, more than about 15-30%, and preferably 20%, of the entire scanning section, the degree of supplemental exposure in the long wave spectral region being increased relative to remaining spectral regions by about 30-70%, and preferably 50%.

17. Process according to claim 16, wherein for the remaining spectral regions the same degree of supplemental exposure is selected.

18. Process according to claim 4, wherein the color density curves of the copy material, which have different linear segment slopes, are adapted to a slope of the color density curve having the flattest color density curve by additionally exposing the copy material to the light of corresponding spectral regions.

19. Process according to claim 18, wherein the supplemental exposures are carried out with constant quantities of light determined from test copies of step wedges, the degree of the supplemental exposure being varied in a respective spectral region until a color balanced copy of the step wedge is obtained.

20. Process according to claim 4, wherein the copy master is examined to detect different color casts in areas of high and low color densities and quantities of light for diffuse supplemental exposures in respective spectral regions are determined in accordance with the color casts detected, said copy material being exposed to the diffuse supplemental exposures.

21. Process according to claim 20, wherein the determination of different color casts in the areas of high and low color densities further includes the steps of:
comparing individual color density values of every scanning section with a neutral density of the scanning region concerned, said neutral density being obtained as an average of all color density values of this scanning section;
subjecting value pairs of color density and neutral density of the copy master for every scanning section to a regressive analysis; and,
exposing the color copy material to light of the spectral regions, wherein the color density variation of the copy master has a steeper slope in a linear segment of a color density curve than the linear segment of the color density curve having the smallest slope.

22. Process according to claim 21, wherein the quantities of light for the diffuse supplemental exposures are determined from relationships of a slope of a linear segment of a color density curve of the copy material and the extent of the supplemental exposure previously determined by test exposures.

23. Process according to claim 4, wherein the supplemental exposures take place before, during or after the imaging exposures.

24. Process according to claim 4, wherein an average spectral composition of the supplemental exposures is adapted to an average spectral composition of the corresponding imaging exposures.

25. Process according to claim 4, wherein the supplemental exposures relative to illumination are adapted to the illumination of the copy master by the imaging exposure and are locally essentially homogeneous.

26. Process according to claim 4, wherein the imaging exposures and the supplemental exposures are carried out with the same source of copying light.

27. Process according to claim 26, wherein for the supplemental exposures the copy master is removed from a beam path of the copy light source and replaced by a locally homogeneous, preferably diffusing element such as a diffusing screen.

28. Process according to claim 26, wherein for the supplemental exposures the light of the copy light source is diverted by pivoting deviating means, preferably mirrors and/or deviating prisms and passed by the copy master onto the photographic copy material.

29. Process according to claim 26, wherein for the supplemental exposures the light of the copy light source is homogenized spectrally and relative to intensity, after passing the copy master and prior to impacting the photographic copy material, by a light mixing device pivotable into the beam path, with said mixing device preferably comprising a mirror shaft and/or diffusing screens and/or optical fiber elements.

30. Process according to claim 21, wherein the regressive analysis is a cubic fit.

31. Apparatus for the preparation of photographic color copies of copy master comprising:
means for spectrally measuring a copy master to provide data from spectral regions of the copy master;
means for determining quantities of copying light for imaging exposure of the copy master from the measured data, said determining means further including means for determining a contrast range of the copy master for each spectral region and for computing quantities of light for homogenous supplemental exposures using the determined contrast range; and,
means for copying the copy master with the quantities of copying light onto photographic copy material having known color density curves, said copying means further including means for additionally exposing the color copying material with the homogenous supplemental light to affect the color density curves.

32. Apparatus according to claim 31, wherein said copying light quantities for the imaging exposure in the spectral regions are reduced by the quantities of light computed for the supplemental exposures.

33. Apparatus according to claim 31, wherein said means for copying further includes:
means for controlling a position of color filters located in a beam path of said copying light;
means for imaging said copying light onto said photographic copy material;
shutter means for passing copying light from said color filters and said imaging means to the photographic copy material; and,
means for selectively deflecting said copying light past the copy master and onto the photographic copy material.

34. Apparatus according to claim 33, wherein said means for deflecting includes a plurality of pivotable mirrors.

35. Apparatus according to claim 33, wherein said means for deflecting includes a plurality of deviating prisms.

36. Apparatus according to claim 33, wherein said means for copying further includes means for diffusing said copying light onto said photographic copy material.

37. Apparatus according to claim 31, wherein said means for copying further includes means for imaging a copying beam of said copying light onto said photographic copy material, a portion of said imaging means being located under said copy master and being displaceable;
means for mixing copying light, said light mixing means being coupled with said displaceable portion of said imaging means.

38. Apparatus according to claim 37, wherein said light mixing means further includes:
means for deviating a copying beam of said copying light; and,
means for diffusing said copying light onto said photographic material.

39. Apparatus for exposure of photographic colors of copy masters comprising:
a copying light source;
means for copying a copy master with a light beam from said copying light onto photographic copy material having known color density curves; and,
means for exposing the photographic copy material with homogenous supplemental light to affect the color density curves.

40. Apparatus according to claim 39, further comprising:
means for controlling a position of color filters located in a beam path of said copying light;
means for imaging said copying light onto said photographic copy material;

shutter means for passing copying light from said color filters and said imaging means to the photographic copy material; and, means for selectively deflecting said copying light past the copy master and onto the photographic copy material.

41. Apparatus according to claim 39, further comprising:

means for imaging a copying beam of said copying light onto said photographic copy material, a portion of said imaging means being located under said copy master and being displaceable;

means for mixing copying light, said light mixing means being coupled with said displaceable portion of said imaging means.

* * * * *